July 18, 1967     A. G. OLIVIERI     3,331,545
WIRE FEED ASSEMBLY
Filed Nov. 10, 1964
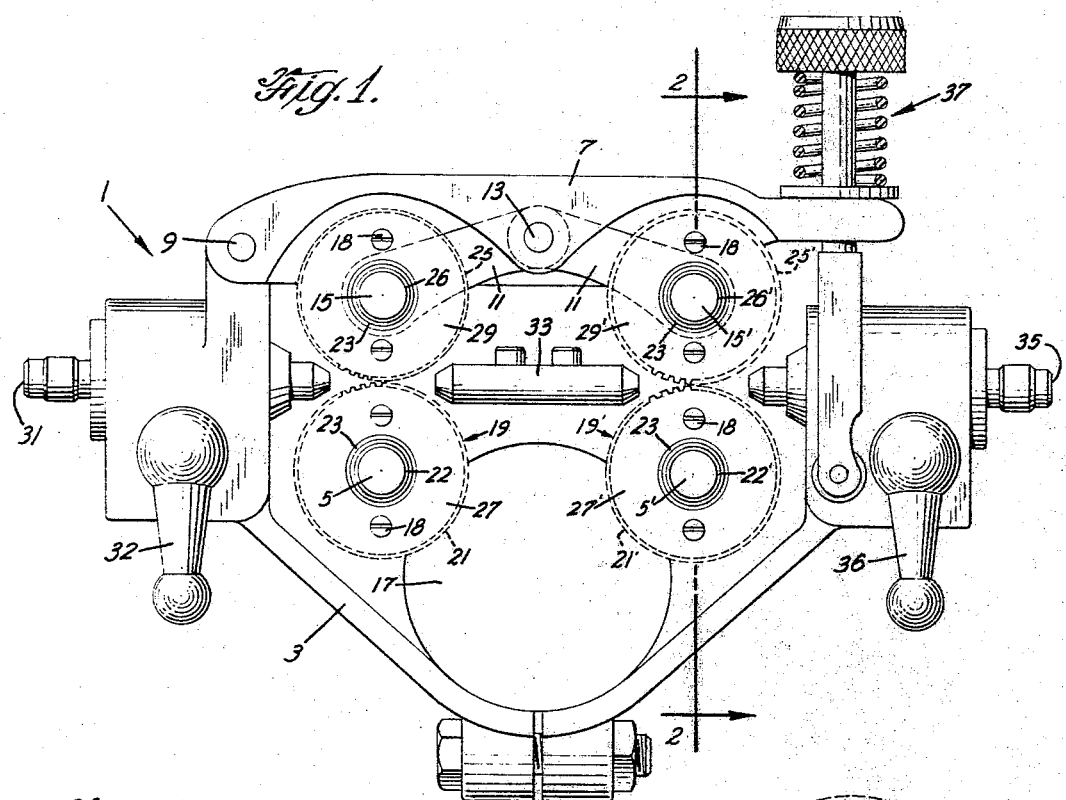
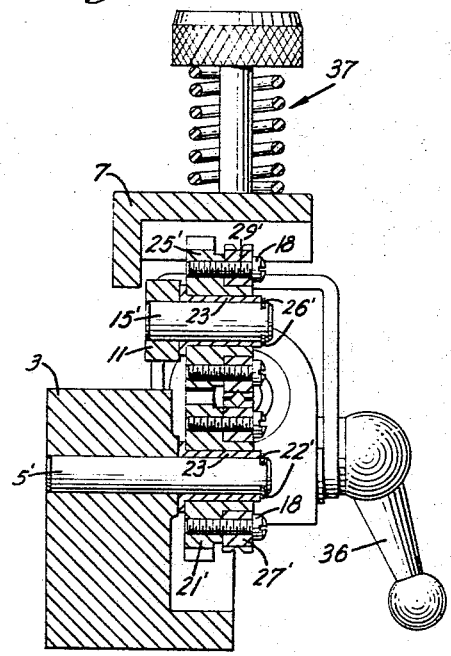
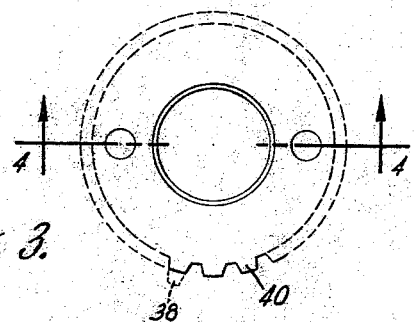
INVENTOR
ANTHONY G. OLIVIERI
BY *Dominick J. Geminello*
ATTORNEY 3,331,545
WIRE FEED ASSEMBLY
Anthony G. Olivieri, Hoboken, N.J., assignor to Union
Carbide Corporation, a corporation of New York
Filed Nov. 10, 1964, Ser. No. 410,106
3 Claims. (Cl. 226—187)

This invention relates to wire feed means and, more particularly, to electrode wire feed means for supplying consumable electrode wires to a welding zone.

Up until the time the present invention was made, wire feed means in the prior art have made use of wire feed rolls with meshing gear teeth. The gear teeth were provided with radially extending recesses which, when combined with the recesses in the meshing gear teeth of the pressure roll, provided a continually changing electrode wire aperture in the meshing gear as the feed rolls rotated.

One of the major shortcomings of such wire feed means is the problem of wear. In ordinary everyday use, such feed rolls would wear rapidly because of the constant rubbing of the wire on the walls of the apertures formed between the meshing recessed gear teeth. This necessitated replacing the entire feed roll assembly, including feed roll, gear and bushing or bearing. Of course, this is a fairly expensive replacement.

Another shortcoming of the prior art systems was the necessity to change the entire feed roll assembly every time a different size or type welding wire was used in the welding process.

Accordingly, it is the main object of the present invention to provide an improved wire feed assembly having a feed and pressure roll with grooved, gear-like teeth which do not mesh and are an inexpensive replaceable part.

Another object is to provide meshing feed roll drive gears and pressure roll drive gears having replaceably mounted thereon a feed roll and pressure roll with grooved, gear-like teeth which do not mesh.

A further object is to provide a welding wire feed assembly which provides easily replaceable feed and pressure rolls to accommodate different size and types of welding wires.

The foregoing objects and other objects and advantages of the invention will be made apparent from the following description and drawings wherein:

FIGURE 1 is a front elevation of a preferred embodiment of the invention;

FIGURE 2 is a section taken along the line 2—2 in FIGURE 1;

FIGURE 3 is a partial front view of a typical feed roll used with the invention; and FIGURE 4 is a cross sectional view of the feed roll shown in FIGURE 3.

In a broad aspect the invention is accomplished with a wire feed roll assembly comprising a drive gear, a feed roll drive gear in mesh with said drive gear, a pressure roll drive gear in mesh with said feed roll drive gear, a feed roll replaceably mounted on said feed roll drive gear, and a pressure roll replaceably mounted on said pressure roll drive gear. In a more limited aspect the feed roll and the pressure rolls are provided with gear-like teeth without the addendum such that the gear-like teeth on the feed roll and the pressure roll are out of mesh. The gear-like teeth on the feed roll and pressure roll are provided with corresponding radially extending grooves for gripping and feeding wire from a source thereof to the point of use.

Referring now to the drawings and the preferred embodiment shown in FIGURE 1, the wire feed assembly is denoted generally at 1 and it includes a housing 3. Stationarily secured in housing 3 are a pair of shafts 5 5′ in parallel alignment with each other in a horizontal plane. A clapper arm 7 is pivotally secured to the housing 3 by roll pin 9. A shaft assembly 11 is pivotally secured to the clapper arm 7 by pin 13. A second pair of shafts 15 and 15′ are stationarily secured to the shaft assembly 11 and are in horizontal alignment with each other and vertical alignment with shafts 5 and 5′, respectively, when in the operating position.

A drive gear mounted on the output shaft of a motor gear reduction unit (not shown) fits into the space 17 provided in housing 3. A pair of feed roll drive assemblies 19 and 19′, each including a feed roll drive gear 21 and 21′ and a bearing 23, are fixedly secured to but free to rotate on shafts 5 and 5′ by retaining rings 22 and 22′. The drive gear fitted into space 17 is in mesh with the feed roll drive gears. The feed roll drive gears are in mesh with pressure roll drive gears 25 and 25′ which are fixedly secured to but free to rotate on shafts 15 and 15′ on clapper arm 7 by retaining ring 26.

Removably mounted, by a pair of screws 18, on the feed roll drive gears 21 and 21′ and on the pressure roll drive gears 25 and 25′, are gear-like feed rolls and pressure rolls 27 and 27′ and 29 and 29′, respectively. A more complete description of these rolls will be given hereinafter in referring to FIG. 3.

A wire guide inlet 31 is provided at one end of the housing 3 for guiding wire from a source thereof to the feed roll and pressure rolls. A center wire guide 33 guides the wire from the first set of rolls to the second set of rolls. A wire guide outlet 35 guides the wire from the second set of feed and pressure rolls to a cable through which the wire is supplied to the welding zone. Wire guides 31 and 35 are locked in place by locking mechanism 32 and 36, respectively.

In operation, the pressure on the wire passing through the wire feed assembly is adjusted by the pressure adjusting mechanism 37. This mechanism applies pressure to the pivoted clapper arm 7. Pressure rolls 29 and 29′ are pivotally mounted on the clapper arm 7 so that the pressure applied by mechanism 37 is equally distributed between pressure rolls 29 and 29′. This has the advantage of providing two gripping surfaces. Therefore, as compared to a single feed roll system not as much pressure has to be applied at one point to grip the wire; accordingly wire deformation is less.

Structurally the feed rolls 27 and 27′ and pressure rolls 29 and 29′ are identical. Referring to FIGURE 3, these rolls are essentially gear-like in structure with the important exception that the addendum 38 has been removed or is omitted from the gear tooth form. Thus, the teeth of the rolls are referred to, for purposes of this disclosure, as being "gear-like" teeth. Each roll has a plurality of "gear-like" teeth 40 formed on the peripheries thereof and extending substantially radially therefrom. Each of the gear-like teeth 40 has a recess or groove 41 provided therein and extending from the radially outer edge of the gear-like teeth inwardly to a point near the root of each gear-like tooth. See FIGURE 4. Wire 42 passes through groove 41.

In operation, these rolls, feed and pressure rolls, are mounted on the meshing feed roll drive gears and pressure roll drive gears such that the gear-like teeth do not mesh and thus are not actively in the drive system as are the feed rolls of the prior art and conversely the feed roll drive gears and pressure roll drive gears are not actually the wire feed rolls. The important advantage of this system is that only the feed and pressure rolls wear. Since these are easily removed from the feed roll drive gear and pressure roll drive gear the necessity of replacing the whole assembly is eliminated.

While in the preferred embodiment, it is desirable that the replaceable rolls be provided with gear-like teeth around the peripheries thereof; replaceable V groove and U groove feed rolls are also within the scope of this invention.

Different types of wires such as steel, aluminum and cored wires (a hollow tubular electrode filled with core material) have different mechanical properties which influence the ease of with which they can be fed through various welding apparatus. Steel wires are hard and have a high column strength. Aluminum wires are soft, have low column strength, and deform easily. Cored wires can have either high or low column strength and are either hard or soft. Different types of feed rolls are preferred for feeding each individual wire according to their characteristics. Smooth V groove feed rolls, have an included angle of less than 90 degrees, grip the wire and impart a great amount of force to the wire. Thus, these feed rolls are preferred for feeding the high column strength steel wires. U-groove feed rolls are preferred for feeding aluminum wires. U-groove feed rolls do not impart as much driving force to the wire. However, since the column strength of the aluminum wire is low, a large amount of driving force is not required. The gear-type feed rools described above, having the form of a gear tooth with a 90 degree. V-groove cut into the outer diameter, have a distinct advantage for feeding cored wires. The sides of the gear teeth actually bite into the wire at four points thereon 90 degrees apart. The advantage of this type of roll is that the forces are applied radially through the wire. Therefore, the wire remains round and the column strength is essentially not affected. Since the wire remains round, the possibility of opening the seam of the cored wire is eliminated.

What is claimed is:

1. A wire feed roll assembly comprising a feed roll drive gear, a pressure roll drive gear in mesh with said feed roll drive gear, a feed roll replaceably mounted on said feed roll drive gear, and a pressure roll replaceably mounted on said pressure roll drive gear, said feed roll and said pressure roll being provided with gear-like teeth without the addendum such that said gear-like teeth on said feed roll and said pressure roll are out of mesh, said gear-like teeth on said feed roll and pressure roll being provided with corresponding radially extending grooves for gripping and feeding wire from a source thereof to a point of use.

2. A wire feed roll assembly comprising a drive gear, a pair of feed roll drive gears in mesh with said drive gear, a pair of pressure roll drive gears in mesh with said feed roll drive gears, feed rools replaceable mounted on said feed roll drive gears, pressure rolls replaceably mounted on said pressure roll drive gears, said feed and pressure rolls being provided with addendum less gear-like teeth so that said gear-like teeth on said feed and pressure rolls are out of mesh, said gear-like teeth on said feed and pressure rolls being provided with corresponding radially extending grooves for gripping and feeding wire from a source thereof to the point of use.

3. In combination with a drive gear mounted on the output shaft of a motor gear reduction unit, a wire feed assembly comprising a pair of feed roll drive gears in mesh with said drive gear, a pair of pressure roll drive gears in mesh with said feed roll drive gears, feed rolls replaceably mounted on said feed roll drive gears, pressure rolls replaceably mounted on said pressure roll drive gears, said feed and pressure rolls being provided with addendum-less gear-like teeth so that said gear-like teeth on said feed and pressure rolls are out of mesh, said gear-like teeth on said feed and pressure rolls being provided with corresponding radially extending grooves for gripping and feeding wire from a source thereof to the point of use.

References Cited

UNITED STATES PATENTS

| | | | |
|---|---|---|---|
| 2,912,612 | 11/1959 | Brady et al. | 226—185 |
| 3,016,451 | 1/1962 | Cornell | 226—181 |
| 3,107,291 | 10/1963 | Evans et al. | 226—108 |

M. HENSON WOOD, Jr., *Primary Examiner.*

C. H. SPADERNA, A. N. KNOWLES,
*Assistant Examiners.*